UNITED STATES PATENT OFFICE.

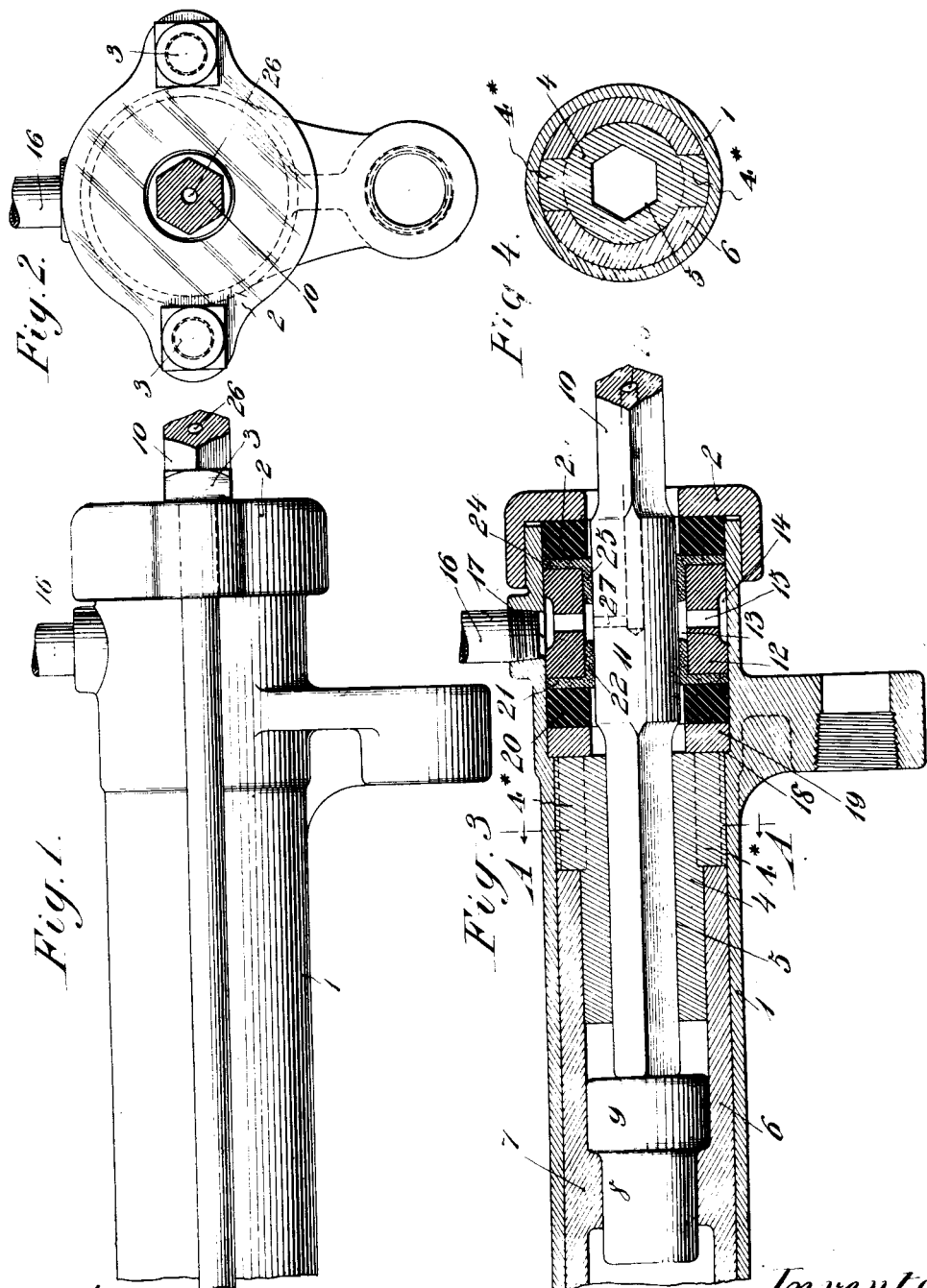

WILLIAM PRELLWITZ, OF EASTON, PENNSYLVANIA, ASSIGNOR TO INGERSOLL-RAND COMPANY, OF NEW YORK, N. Y., A CORPORATION OF NEW JERSEY.

HAMMER-DRILL.

1,078,952.  Specification of Letters Patent.  Patented Nov. 18, 1913.

Application filed February 6, 1909. Serial No. 476,499.

*To all whom it may concern:*

Be it known that I, WILLIAM PRELLWITZ, a citizen of the United States, and resident of Easton, in the county of Northampton and State of Pennsylvania, have invented a new and useful Improvement in Hammer-Drills, of which the following is a specification.

This invention relates to hammer drills and has for its object to provide a novel construction at the front end of the drill, which construction, combined with a hollow drill steel of novel form, will be particularly well adapted for feeding fluid under pressure to the drill steel; fluid tight packings being provided for the pressure fluid feeding chamber, the said pressure fluid feeding chamber and its adjacent parts being located within the front end of the drill cylinder.

In the accompanying drawings, Figure 1 represents in side elevation the front end of a hammer drill, with the invention applied thereto, the hollow drill steel being broken away, Fig. 2 is a front end view of the same, Fig. 3 is a detail longitudinal central section through the front end of the hammer drill with its steel and anvil block shown in side elevation, and Fig. 4 is a transverse section taken in the plane of the line A—A of Fig. 3, looking in the direction of the arrows, the drill steel being removed.

The hammer drill cylinder is denoted by 1, the front end of which is closed by a front head 2 held in position by the usual longitudinally extended tie bolts 3.

The drill chuck is denoted by 4 and it is provided with an open ended drill steel receiving socket 5 angular in cross section. This chuck is interlocked by wings 4*, 4* with the front end of a sleeve 6 located within the cylinder 1. This sleeve is rotated in the usual manner by the reciprocation of the hammer piston not shown herein and is provided at a distance inwardly from its end with an annular interior rib 7 forming a reduced bore for the shank of the anvil block, the head 9 of which anvil block is adapted to engage the striking end of the drill steel 10 which projects slightly beyond the inner end of the chuck 4. This inner end of the drill steel 10 is angular in cross section so as to cause the drill steel to turn with its chuck and adjacent to this angular portion of the drill steel there is provided a cylindrical portion 11.

Surrounding the cylindrical portion 11 of the drill steel within the front end of the cylinder 1 is a short tube 12, the bore of which is slightly greater in diameter than the diameter of the cylindrical portion 11 of the drill steel so as to form an annular fluid pressure feeding chamber 13. This tube 12 is further provided with a circumferential groove 14 in open communication with the chamber 13 through one or more transverse holes 15. This circumferential groove 14 is in open communication with a pressure fluid supply pipe 16 secured within a transverse hole 17 in the cylinder 1.

The interior of the front end of the cylinder 1 has a slightly enlarged bore from a point at the outer end of the chuck 4, forming a shoulder 18 between which shoulder and the inner end of the tube 12 are interposed a rigid ring 19, an elastic ring 20 and the base 21 of a cup washer 22, which cup washer forms a fluid tight packing between the hollow drill steel and the tube 12 at the inner end of the said tube. An elastic ring 23 and the base 24 of a cup-washer 25 is interposed between the front head 2 and the outer end of the tube 12, the cup-washer 25 serving as a fluid tight packing between the drill steel and the said tube. These cup washers 22 and 25 are oppositely disposed and together form fluid tight packings for the annular pressure fluid feeding chamber 13. The elastic rings 20 and 23 serve as fluid tight packings for the circumferential groove 14 which forms the outer annular pressure fluid feeding chamber.

The longitudinally arranged axial bore 26 is provided with a transverse hole 27 leading therefrom into open communication with the pressure fluid feeding chamber 13, the construction being such that the bore 26 is at all times in open communication with the said pressure fluid feeding chamber during the slight longitudinal reciprocatory movements of the drill steel during the operation of the drill.

The construction and arrangement of the parts as here shown and described will permit the rotation of the chuck and drill steel and will permit the operation of the steel without affecting the fluid pressure supply therefor, the parts at the same time being so constructed that leakage of the pressure fluid is effectually prevented and the ready renewal of the parts subject to wear may be accomplished.

What I claim is:

1. In combination, a cylinder, a chuck therein, a front head, a tube mounted within the cylinder and having a pressure fluid feeding chamber therein and a pressure fluid feeding passage therefor, a hollow drill steel having a cylindrical portion within said chamber, and having a passage connecting its bore with said chamber, cup washers interposed between the said tube and cylindrical portion of the drill steel and elastic rings interposed between the outer and inner ends of the said tube, and the front head and outer end of the chuck, respectively.

2. In combination, a cylinder, a chuck rotatably mounted therein, a front head, a tube mounted within the cylinder and having a pressure fluid feeding chamber therein and a pressure fluid feeding passage therefor, a hollow drill steel having a cylindrical portion within said chamber and having a passage connecting its bore with said chamber, cup washers interposed between the said tube and cylindrical portion of the drill steel and elastic rings interposed between the outer and inner ends of the said tube, and the front head and outer end of the chuck, respectively.

In testimony, that I claim the foregoing as my invention, I have signed my name in presence of two witnesses, this fourth day of February 1909.

WILLIAM PRELLWITZ.

Witnesses:
F. GEORGE BARRY,
HENRY THIEME.